United States Patent
Castellar et al.

(10) Patent No.: US 8,203,503 B2
(45) Date of Patent: Jun. 19, 2012

(54) SENSOR AND DISPLAY-INDEPENDENT QUANTITATIVE PER-PIXEL STIMULATION SYSTEM

(75) Inventors: Javier Castellar, Truckee, CA (US); David Lloyd Morgan, III, Leawood, KS (US)

(73) Assignee: Aechelon Technology, Inc., San Francisco, CA (US)

( * ) Notice: Subject to any disclaimer, the term of this patent is extended or adjusted under 35 U.S.C. 154(b) by 1639 days.

(21) Appl. No.: 11/222,897

(22) Filed: Sep. 8, 2005

(65) Prior Publication Data
US 2007/0236516 A1 Oct. 11, 2007

(51) Int. Cl.
*G09G 5/00* (2006.01)
*G09B 9/08* (2006.01)
(52) U.S. Cl. .................. 345/9; 345/7; 434/37
(58) Field of Classification Search .......... 345/8, 9; 434/29, 35, 37, 38, 41, 43, 44
See application file for complete search history.

(56) References Cited

U.S. PATENT DOCUMENTS

| | | | |
|---|---|---|---|
| 4,645,459 A | 2/1987 | Graf et al. | |
| 4,821,212 A | 4/1989 | Heartz | |
| 4,890,249 A | 12/1989 | Yen | |
| 5,179,638 A | 1/1993 | Dawson et al. | |
| 5,380,204 A | 1/1995 | Decker | |
| 5,995,903 A | 11/1999 | Smith et al. | |
| 6,196,845 B1 * | 3/2001 | Streid | 434/44 |
| 6,545,672 B1 | 4/2003 | Goyins | |
| 6,735,557 B1 | 5/2004 | Castellar et al. | |
| 6,780,015 B2 * | 8/2004 | Swaine et al. | 434/44 |
| 2002/0180999 A1 | 12/2002 | Kanai | |
| 2003/0147053 A1 | 8/2003 | Matsuda | |

OTHER PUBLICATIONS

William H. De Boer, Fast Terrain Rendering Using Geometrical MipMapping, E-mersion Project, Oct. 2000, pp. 1-7.
Anders Kugler, IMEM: An Intelligent Memory for Bump- and Reflection-Mapping, ACM 1998, 1-58113-097-/98/8, pp. 113-122.
David Cline, Interactive Display of Very Large Textures, IEEE, 0-8186-9176, 1998, pp. 343-350 & 549.
MIL STD 2408(DMA), Glossary of Feature and Attribute Definitions, Apr. 21, 1995, pp. 1-511.
Stephen H. Gersuk, "Quantitative IR Rendering in the SGI Graphics Pipeline", Paradigm Simulation, Inc., Feb. 2, 1999, pp. 1-6.
David C. Anding, Real-Time Image Visualization for Sensors, R-015-96(3-15), pp. 1-10.
Sensor Texture Maps (STMs) for Multi-Spectral Scene Simulation, Photon Research Associates (PRA), Apr. 1999, pp. 1-16.

(Continued)

*Primary Examiner* — Srilakshmi K Kumar
(74) *Attorney, Agent, or Firm* — Fenwick & West LLP

(57) ABSTRACT

Sensor independent display characterization system spectrally characterizes a display system to measure radiant power emitted by the display system that displays a video image to a trainee pilot during sensor stimulation. A sensor spectral response for each wavelength produced by the stimulated sensor is determined. A stimulated luminance for each color level of the displayed image or for a range of color levels is computed. A color look up table that maps computed stimulated luminance to a set of stimulating color values is generated. When a trainee pilot looks at the displayed image using a sensor having a sensor response that was used in computing the stimulated luminance, the pilot will see an image that was created by simulated spectral rendering. The displayed image is an accurate, display and sensor independent image that the pilot can see during the real flight.

34 Claims, 5 Drawing Sheets

OTHER PUBLICATIONS

Ziyad S. Hakura, The Design and Analysis of a Cache Architecture for Texture Mapping, ACM 0-89791-901-7/97/0006,1997, pp. 108-120.
Office Action for Canada Patent Application No. 2,559,417, Jun. 11, 2009, 2 Pages.
Supplementary European Search Report for European Patent Application No. 06844169, Jan. 25, 2010, 8 Pages.
Examination Report for New Zealand Patent Application No. 567233, Oct. 9, 2009, 1 Page.
Salam, P., "7.2: OLED and LED Displays with Autonomous Pixel Matching," SID International Symposium, Jun. 3-8, 2001, pp. 67-69.
New Zealand Examination Report, New Zealand Application No. 567233, Dec. 2, 2010, 2 pages.
New Zealand Examination Report, New Zealand Application No. 567233, Mar. 24, 2011, 3 pages.

* cited by examiner

SENSOR AND DISPLAY-INDEPENDENT QUANTITATIVE PER-PIXEL STIMULATION SYSTEM

BACKGROUND OF THE INVENTION

1. Field of the Invention

The present invention relates generally to providing computerized simulations of real-world views. In particular, the present invention is directed towards a sensor and display-independent quantitative per-pixel stimulation system.

2. Description of the Related Art

Pilots of aircrafts or other pilot-controlled vehicles sometimes guide their aircraft over a given terrain with the assistance of vision-augmenting equipment known as sensors, including, for example, Night Vision Goggles (NVG's) and Low Level Light Television Cameras (LLLTV's). Sensors typically are used to convert hard-to-see imagery in one or more of the visible and/or invisible spectral bands into imagery that is more clearly visible to the human eye. Sensors often display imagery that is different from the one a pilot may be accustomed to seeing naturally with his or her own eyes (also known as an out-the-window view). Therefore, it is desirable to train pilots ahead of time so that they can correctly interpret what they see with sensors during actual flights.

Flight simulators are commonly used to simulate flight training environments. Flight simulators typically include one or more video display screens onto which video images are projected by one or more projectors. Two known approaches are used in pilot training: simulation systems and stimulation systems.

Simulation systems display images as they would appear to a pilot using a given sensor. For example, if NVGs are being simulated, the display shows an image on a head-mounted display as it might appear to a pilot wearing NVGs. Since the displayed image already incorporates the wavelength translations performed by the sensor—i.e. the system displays simulated images—these types of systems do not allow the pilot to use actual vision-augmenting equipment during training. This is considered a drawback of simulated systems, because a pilot's experience using the simulator will differ from that during actual flight-for example, wearing NVGs, a pilot may see a sensor-based image occupying most of his field of vision, but may see a regular out-the-window image using his peripheral vision. Since in a simulated system only a sensor-adjusted image is displayed, and is based on head tracking, the experience differs from that of the real world. The disparity between the simulator and the real world experience is further augmented by the pilot not being able to wear the sensor equipment.

Stimulated systems, on the other hand, provide a pilot with a stimulated image that can be viewed using an appropriate sensor, e.g., one that can be worn by the pilot. Again using the example of NVGs, with a stimulated system the images displayed will match the spectral wavelengths to which the NVGs are sensitive, allowing the pilot to use a real pair of NVGs and thus provide a more realistic experience. However, because display systems vary widely in their display characteristics, the spectra emitted by one system might appear drastically different than those emitted by a second system, and the real world image different still. Accordingly, stimulated systems are generally of lower fidelity than simulated systems, providing only a qualitative experience versus the more quantitative experience of simulated systems.

Accordingly, what is needed is a system and method for providing high-quality stimulated imaging.

SUMMARY OF THE INVENTION

The present invention enables a sensor-independent per-pixel stimulating spectral method and apparatus that is configurable across different display systems and which combines quantitative simulated sensor rendering with a stimulated system.

Initially, a display system to be used with a system of the present invention is characterized according to the particulars of its emissions. An image generator (IG) generates a test pattern that is then displayed by the display system to be characterized. A spectroradiometer measures radiant power emanating from the display and stores the data. The process is repeated for various combinations of test pattern images—for example, for a color-independent RGB display, each value of red, each value of green, and each value of blue is measured.

Once the display has been characterized (also known as calibrated), the present invention creates color lookup tables that map simulated luminance to stimulating color values. This mapping is specific to the display that has been characterized and to the sensor that will be used with the display.

Once the display has been characterized and the color lookup tables created, the present invention is ready to be used for flight (or other) simulation. A simulated image stream is received by the present invention, and using the color lookup tables, for each luminance value provided in the stream, a set of RGB values (or other input values, depending on the display technology involved) is determined that will produce the equivalent stimulated image on the display system. Those color values are then provided to the display system by the IG, and displayed for use with the appropriate sensor.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
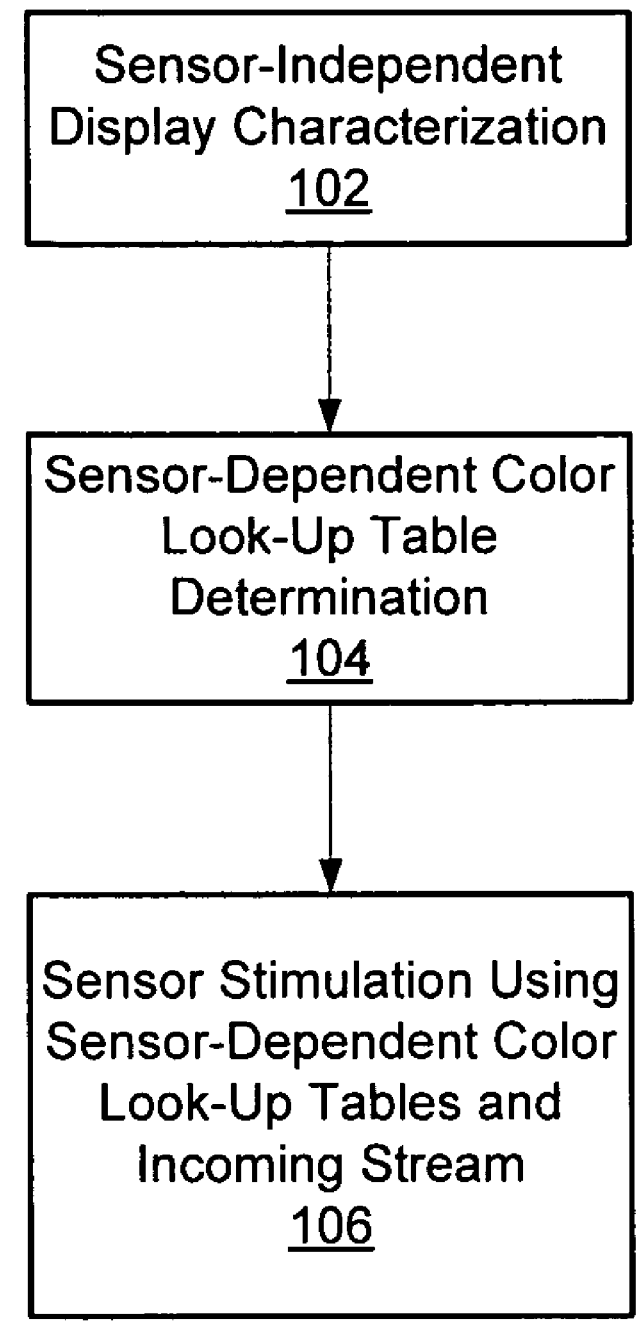
FIG. 1 illustrates a method for performing sensor and display-independent sensor stimulation in accordance with an embodiment of the present invention.

FIG. 1 illustrates three steps of a method for performing sensor and display-independent sensor stimulation. First, the display system that will be used in conjunction with the sensor is characterized 102 according to the particulars of its emissions. Next, sensor-dependent color lookup tables that map simulated luminance to stimulating color values are created 104. This mapping is specific to the display that has been characterized and to the sensor that will be used with the display. Finally, a simulated image stream is received by the present invention, and using the color lookup tables, for each luminance value provided in the stream, a set of RGB values (or other input values, depending on the display technology involved) is determined 106 that will produce the equivalent stimulated image on the display system. Those color values are then provided to the display system for use with the appropriate sensor. Each of these steps is described further below.

System Architecture

Figure 2:
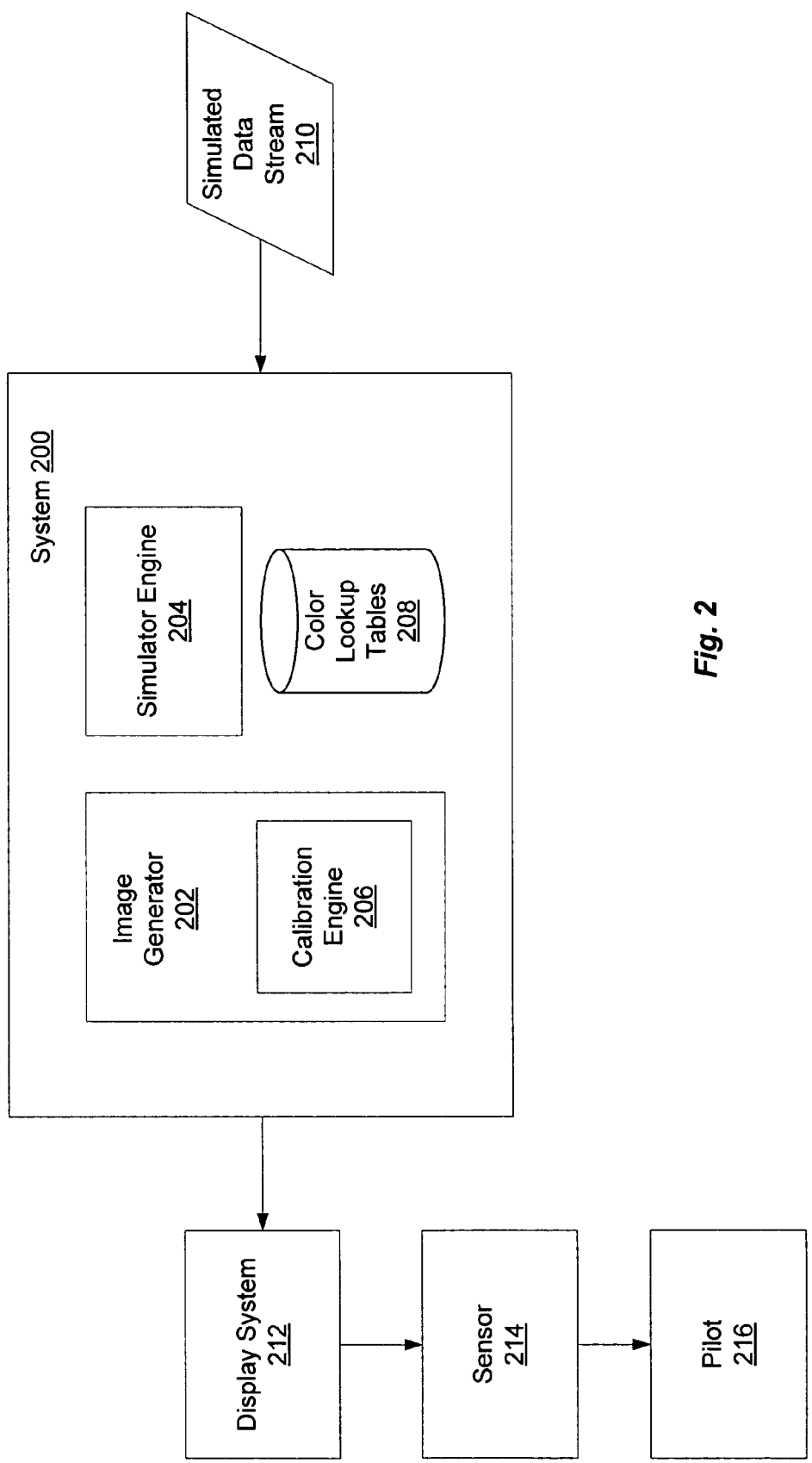
FIG. 2 illustrates a system for providing stimulated images in accordance with an embodiment of the present invention.

FIG. 2 illustrates a system 200 for providing stimulated images in accordance with an embodiment of the present invention. System 200 includes an image generator (IG) 202 and its calibration engine 206, a simulator engine 204, and color lookup tables 208. Each of these components is further described below. FIG. 2 also includes a simulated data stream 210, a display system 212, a sensor 214, and a pilot 216, meant to represent a user of system 200.

Calibration

Because each display system has its own particular characteristics, the exact spectral emissions from the display system will vary between systems receiving the same input. Indeed, even a single display system may develop different characteristics over time, for example as the projector ages. Consequently, it is preferable to first calibrate system 200 for use with a particular display system 212.

Figure 3:
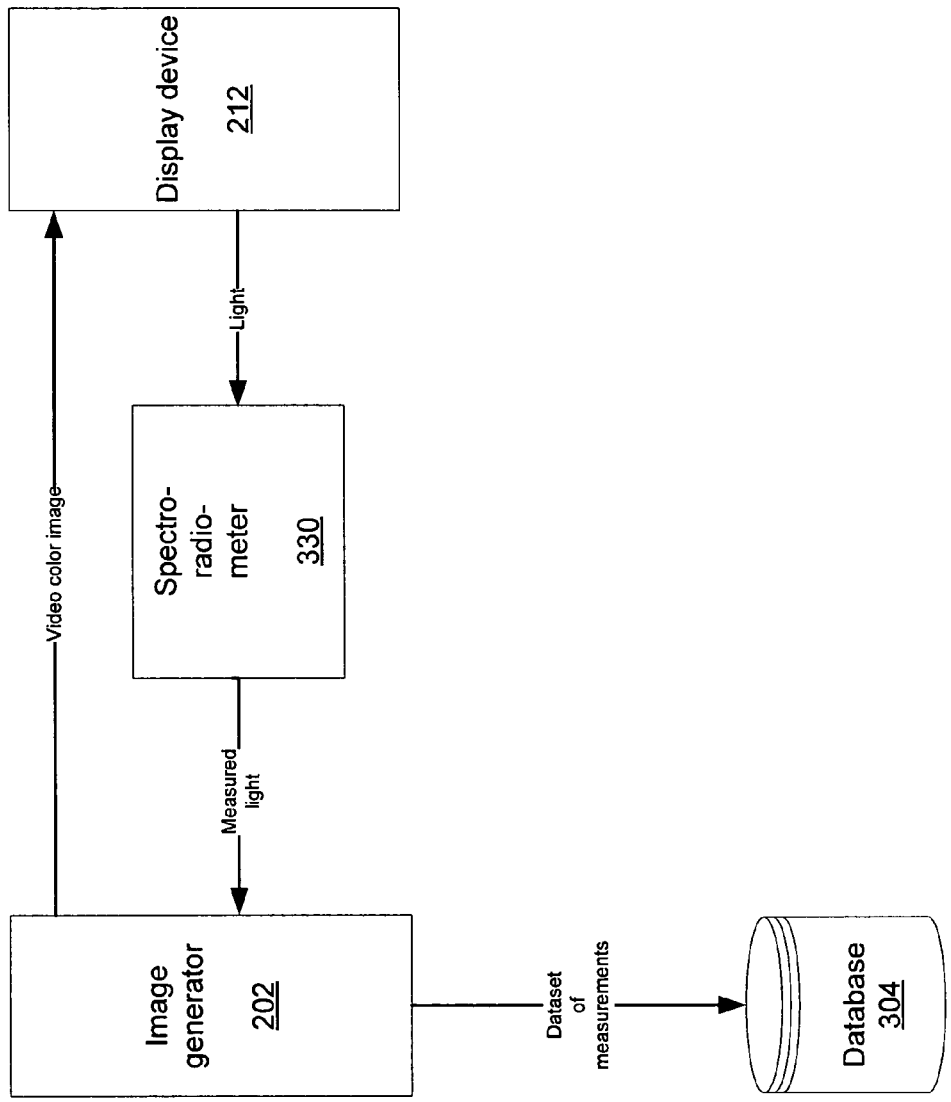
FIG. 3 is a block diagram illustrating a display characterization function in accordance with an embodiment of the present invention.

FIG. 3 illustrates a way in which display characterization is preferably performed. Image generator 202 creates or displays a color video image assigned to a given color or video level. For display calibration, image generator 202 preferably includes a test pattern generator. IG 202 sends images for display to display system 212. Display system 212 is a monitor, screen, video projector, rear projector, dome, or any other device adapted to display an image. During display calibration, display system 212 receives images from IG 202 and displays the images. The display is then measured by a spectroradiometer 330. That is, the radiant power or energy per wavelength emanating from display system 212 is measured by the spectroradiometer 330. In one embodiment, spectroradiometer 330 is the PR-715 spectroradiometer, by Photo Research Inc. of Chatsworth, Calif.; in an alternative embodiment, spectroradiometer 330 is the Minolta R-1000 by Konica Minolta of Japan. Spectroradiometer 330 returns the results of its measurements to IG 202, which stores the data sets, e.g., in database 304.

The result of the display calibration is a series of power spectral tables or datasets for each measured color video level, or for each of the display input levels.

Figure 4:
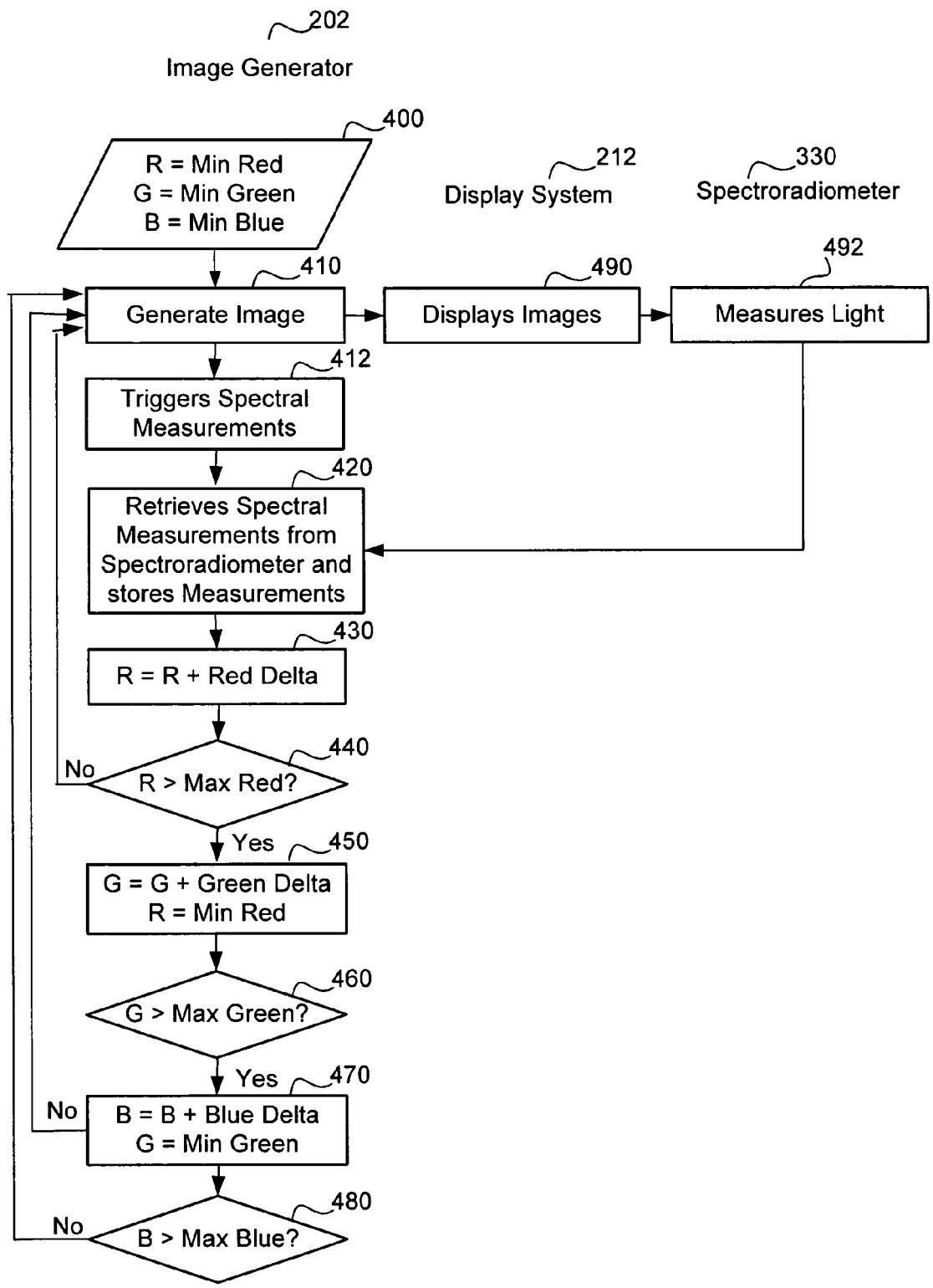
FIG. 4 illustrates a method for automatic display calibration in accordance with an embodiment of the present invention.

FIG. 4 is a trace diagram of a method for automatic display calibration performed by system 200 in accordance with one embodiment of the present invention. Initially, at step 400, calibration engine 206 sets intensity values for red, green and blue to a minimum value, e.g., 0 intensity. IG 202 generates 410 an image such as a test pattern and sends it to display system 212, which then displays 490 the image. A test pattern in a preferred embodiment corresponds to specified red, green and blue values. The example of FIG. 4 illustrates the case in which initially only red values are displayed, and then green and then blue data values are added in as described below. Calibration engine 206 next activates 412 spectroradiometer 330 to perform spectral measurements. Spectroradiometer 330 measures 492 emissions from display system 412 and sends 420 the measurements back to calibration engine 206. Assuming for purposes of the illustrated example that there are 256 possible values of red intensity, calibration engine 206 increments 430 the value (intensity) of the image being displayed by a delta amount. If 440 the new red-value does not exceed a maximum red value, the process returns to step 410 and the image with the new red value is then measured by spectroradiometer 330. Once all of the red intensity values have been measured, the red intensity value is reset 450 to its original value, and values are then measured for each green intensity value (i.e. for each intensity value of green, 256 values of red intensity are measured). Once 460 the value of green intensity reaches its maximum, blue values are then measured 470 for each intensity value of red and green. At the conclusion of all steps, emissions for intensity values for each combination of red, green and blue have been measured and stored by calibration engine 206. In this example, 256×256× 256=16,777,216 measurements.

In an alternative embodiment using display systems that feature true color independence, such as on CRT RGB video projectors, the number of measurements taken can be reduced. Because of their color independence, there is no need to measure all color parameter combinations—only the independent values of each color. In the case of RGB color parametric space, if 256 levels are used, only 256+256+256=768 measurements will be required, compared the 16,777,216 measurements required when a display system lacks color independence.

Figure 5:
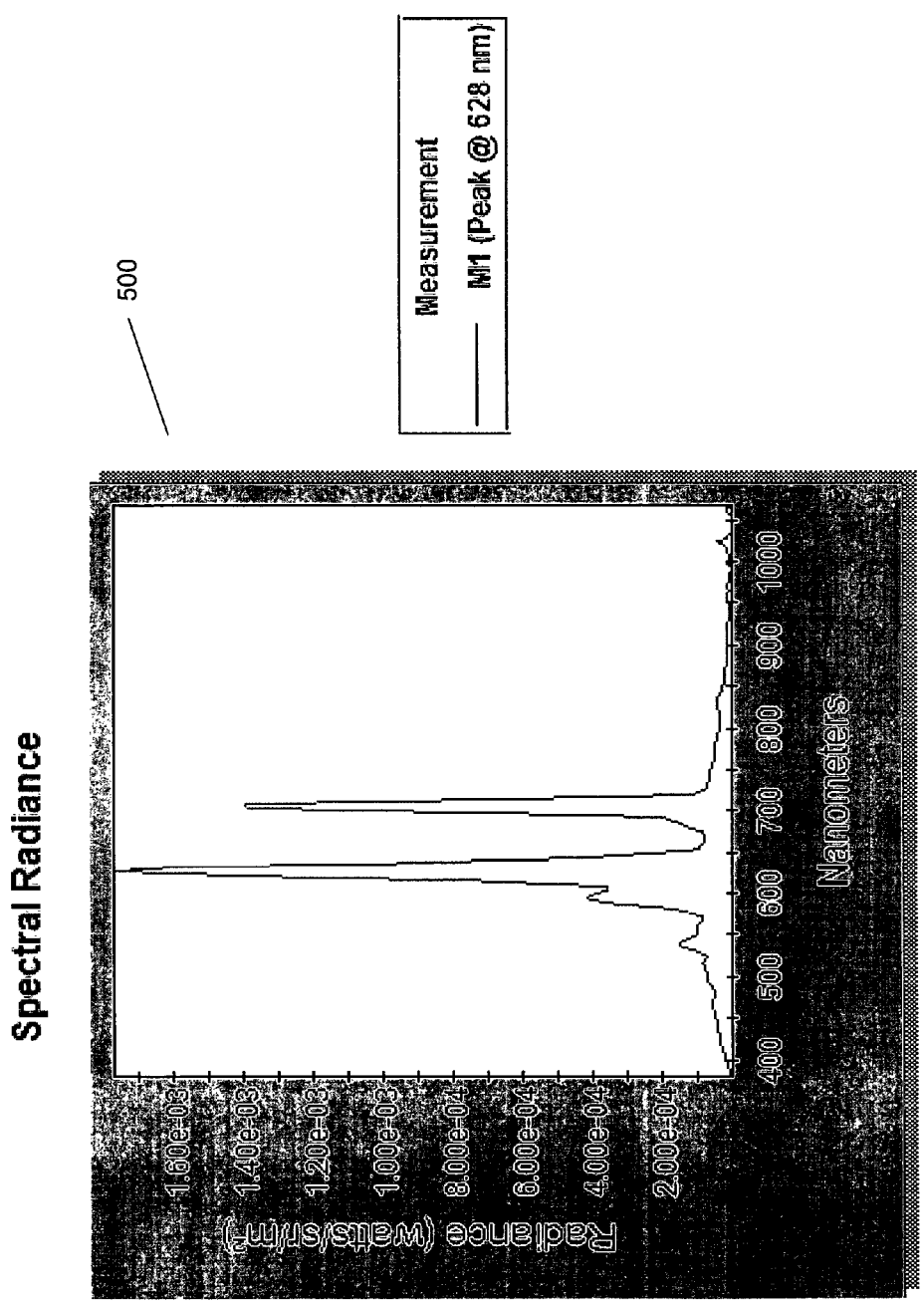
FIG. 5 illustrates an example spectral radiance graph in accordance with an embodiment of the present invention.

FIG. 5 illustrates an example spectral radiance graph 500 for a measurement taken with a red value of 255, and blue and green values of 0 each.

Color Lookup Table Determination

System 200 uses color lookup tables 208 to map simulated luminance to stimulating color values. That is, color lookup tables 208 indicate for a particular simulated luminance that is part of simulated data stream 210 what corresponding color values of a stimulated image would produce that simulated luminance given a particular sensor and a particular display device. Once the stimulated color values are known they can be sent by image generator 202 to display system 212 and viewed by pilot 216 using sensor 214.

As is known by those of skill in the art, a sensor 214 such as NVGs enables increased perception of the environment by amplifying and translating the wavelengths captured by the sensor. A particular sensor has a spectral response that is characteristic of that sensor and can be determined experimentally using methods known to those of skill in the art, or obtained from the manufacturer of the sensor. The spectral response of the sensor is the response of the sensor to a power at a given wavelength (or range of wavelengths).

Thus, simulator engine 204 constructs a color lookup table by iterating through the various color value combinations, e.g., RGB values from 0 to 255. For each color value, simulator engine 204 determines the actual image that would be displayed by the particular display system 212, and the stimulated luminance value that would be produced by the sensor from the displayed image values. Performing this step for each color value and then sorting by resulting luminance provides a color lookup table 208 that system 200 then can use to map from a luminance value to a color value set that can be used with the specified sensor on the calibrated display system.

In an alternative embodiment, luminance values that result in deviant colors—i.e. those colors that vary substantially from grayscale values—are excluded from the lookup table. This has the effect of producing images that while still stimulating the sensor create less distracting colors for an observer not wearing a sensor such as NVGs, as well as being less distracting through peripheral vision of an observer who is wearing a sensor like NVGs, which only covers a subset of the field of view. This takes advantage of the fact that unaided human vision at night or at low light levels is not very perceptive of small color deviations from gray scale.

Run-Time Operation

System 200 uses color lookup table 208 to render pixels or texels appropriate to the display system 212 and sensor 214 in use in the simulator. Simulator engine 204 takes as input a simulated data stream 210 provided by conventional real-time sensor simulation software or hardware, determines a corresponding stimulating color value set by referring to color lookup table 208, and generates an image using IG 202 that is then displayed by display system 212. Because the color lookup table 208 is specific to the display system 212 in use as well as to the sensor in use, the stimulated image generated by IG 202 will look to a pilot 216 using sensor 214 and display system 212 essentially identical to the simulated image originally provided by the simulated stream 210. However, because the image is stimulated instead of simulated, the pilot has the advantage of being able to participate in a much more real-world simulation, e.g., by wearing NVGs that correctly account for peripheral vision effects, head motion, and the like—and because the stimulated image is accurate for the display system and the sensor in use, the lack of fidelity that previously plagued stimulated image systems is not present when using system 200.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the image generator and so forth may be provided in many or one module.

Some portions of the above description present the feature of the present invention in terms of algorithms and symbolic representations of operations on information. These algorithmic descriptions and representations are the means used by those skilled in the art of sensor simulation to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for providing stimulated images, the method comprising:
   determining measured spectral characteristics that characterize a display device;
   determining spectral response characteristics for a sensor;
   determining, by a computer according to the measured spectral characteristics of the display device and the spectral response characteristics of the sensor, for each of a plurality of luminance values a set of stimulating color parameters;
   receiving a simulated data stream, the simulated data stream including a plurality of simulated luminance values; and
   for each simulated luminance value, providing to the display device the set of stimulating color parameters.

2. The computer-implemented method of claim 1 wherein providing the set of stimulating color parameters to the display device further comprises:
   responsive to a determination that the stimulating color parameters exceed a predefined threshold, adjusting the parameters to be within the threshold prior to providing the parameters to the display device.

3. The computer-implemented method of claim 1 wherein determining the spectral characteristics of the display device further comprises:
supplying an image to the display system, the image having a set of color parameters;
measuring the spectral radiance output from the display device;
storing an association between the set of color parameters and the spectral radiance output.

4. The computer-implemented method of claim 1 wherein the stimulating color parameters include red, green and blue values.

5. The computer-implemented method of claim 1 wherein the stimulating color parameters include grayscale values.

6. The computer-implemented method of claim 1 wherein the sensor includes night vision goggles.

7. The computer-implemented method of claim 1 wherein the sensor includes low level light television cameras.

8. The computer-implemented method of claim 1 wherein the display device is a monitor.

9. The computer-implemented method of claim 1 wherein the display device is a screen.

10. The computer-implemented method of claim 1 wherein the display device is a video projector.

11. The computer-implemented method of claim 1 wherein the display device is a rear projector.

12. The computer-implemented method of claim 1 wherein the display device is a dome.

13. The computer-implemented method of claim 1 wherein the display device is a collimated display system.

14. The computer-implemented method of claim 1 wherein the spectral characteristics of the display device are determined using a spectroradiometer.

15. The computer-implemented method of claim 1, wherein determining, for each of the plurality of luminance values the set of stimulating color parameters comprises:
creating a color look up table that maps each of the plurality of luminance values to a stimulating color parameter from the set of stimulating color parameters.

16. A system for providing stimulated images, the system comprising:
an image generator, for providing images to a display device;
a calibration engine, communicatively coupled to the image generator, for determining measured spectral characteristics that characterize the display device;
a simulator engine for:
determining, according to the measured spectral characteristics of the display device and spectral response characteristics of a sensor, for each of a plurality of luminance values a set of stimulating color parameters;
receiving a simulated data stream, the simulated data stream including a plurality of simulated luminance values; and
for each simulated luminance value, causing the image generator to provide to the display device the set of stimulating color parameters.

17. The system of claim 16, further comprising:
a storage device, communicatively coupled to the calibration engine, for storing at least one table mapping luminance values to stimulating color parameters.

18. The system of claim 16 wherein the calibration engine is further adapted to receive radiant power data associated with the display device.

19. The system of claim 18 wherein the radiant power data is received from a spectroradiometer.

20. The system of claim 16 wherein the sensor includes night vision goggles.

21. The system of claim 16 wherein the sensor includes low level light television cameras.

22. The system of claim 16 wherein the display device is a monitor.

23. The system of claim 16 wherein the display device is a screen.

24. The system of claim 16 wherein the display device is a video projector.

25. The system of claim 16 wherein the display device is a rear projector.

26. The system of claim 16 wherein the display device is a dome.

27. The system of claim 16 wherein the display device is a collimated display system.

28. The system of claim 6, wherein determining for each of a plurality of luminance values a set of stimulating color parameters comprises:
creating a color look up table that maps each of the plurality of luminance values to a stimulating color parameter from the set of stimulating color parameters.

29. A computer program product for providing stimulated images, the computer program product stored on a non-transitory computer-readable storage medium and including instructions configured to cause a processor to carry out the steps of:
determining measured spectral characteristics that characterize a display device;
determining spectral response characteristics for a sensor;
determining, according to the measured spectral characteristics of the display device and the spectral response characteristics of the sensor, for each of a plurality of luminance values a set of stimulating color parameters;
receiving a simulated data stream, the simulated data stream including a plurality of simulated luminance values; and
for each simulated luminance value, providing to the display device the set of stimulating color parameters.

30. The computer program product of claim 29 wherein providing the set of stimulating color parameters to the display device further comprises:
responsive to a determination that the stimulating color parameters exceed a predefined threshold, adjusting the parameters to be within the threshold prior to providing the parameters to the display device.

31. The computer program product of claim 29 wherein determining the spectral characteristics of the display device further comprises:
supplying an image to the display system, the image having a set of color parameters;
measuring the spectral radiance output from the display device;
storing an association between the set of color parameters and the spectral radiance output.

32. The computer program product of claim 29 wherein the stimulating color parameters include red, green and blue values.

33. The computer program product of claim 29 wherein the stimulating color parameters include grayscale values.

34. The computer program product of claim 29, wherein determining for each of a plurality of luminance values a set of stimulating color parameters comprises:
creating a color look up table that maps each of the plurality of luminance values to a stimulating color parameter from the set of stimulating color parameters.

* * * * *

UNITED STATES PATENT AND TRADEMARK OFFICE
CERTIFICATE OF CORRECTION

| | | |
|---|---|---|
| PATENT NO. | : 8,203,503 B2 | |
| APPLICATION NO. | : 11/222897 | |
| DATED | : June 19, 2012 | |
| INVENTOR(S) | : Javier Castellar et al. | |

It is certified that error appears in the above-identified patent and that said Letters Patent is hereby corrected as shown below:

Claim 28, column 8, line 18, please delete "claim 6" and insert --claim 16--.

Signed and Sealed this
Second Day of October, 2012

David J. Kappos
*Director of the United States Patent and Trademark Office*